Feb. 16, 1926.
B. W. KADEL
YOKE
Filed April 26, 1923
1,573,249
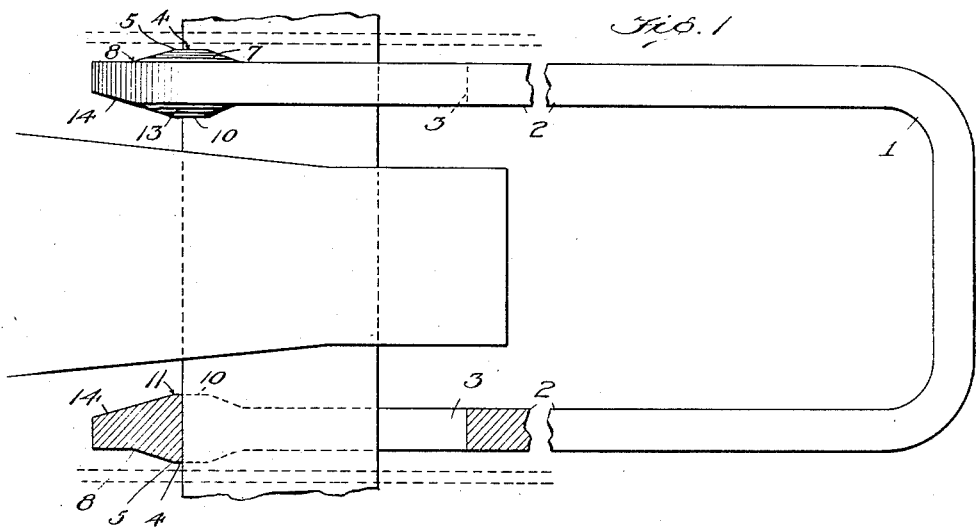
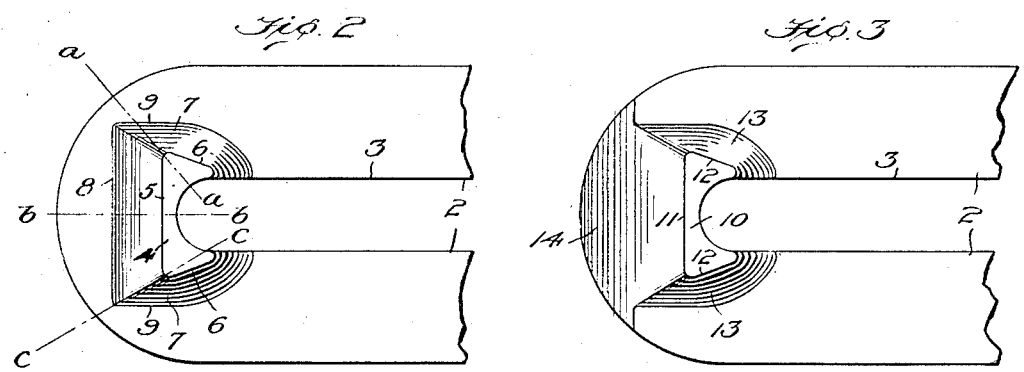
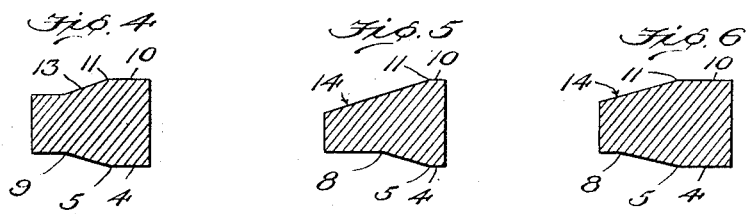
Inventor
Byron W. Kadel
By Ernest F. Mechlin
his Attorney Patented Feb. 16, 1926.

1,573,249

UNITED STATES PATENT OFFICE.

BYERS W. KADEL, OF BALTIMORE, MARYLAND, ASSIGNOR, BY MESNE ASSIGNMENTS, TO THE SYMINGTON COMPANY, A CORPORATION OF MARYLAND.

YOKE.

Application filed April 26, 1923. Serial No. 634,832.

*To all whom it may concern:*

Be it known that I, BYERS W. KADEL, a citizen of the United States, residing at Baltimore, in the State of Maryland, have invented certain new and useful Improvements in Yokes; and I do hereby declare the following to be a full, clear, and exact description of the invention, such as will enable others skilled in the art to which it appertains to make and use the same.

My invention relates to railway yokes and generally stated provides a construction involving an improved disposition of the metal in and about the forward ends of the yoke arms adjacent the front ends of the key slots whereby breakage and failures of the yokes at these points are reduced to a minimum.

The invention has for a principal feature the provision of a horizontal yoke having the forward ends thereof relatively strengthened by an advantageous disposition of the metal immediately above and below the front end portions of the slots and the forward ends of the yoke arms, the relative thickness of the metal in cross section being increased both longitudinally and vertically for a comparatively large area around the forward ends of the key slots.

Another object of the invention is to provide a horizontal yoke such as is used with the Farlow type of draft rigging, said yoke having the inner forward faces of the yoke arms cut away to provide maximum angular movement for the coupler, the metal not used as the result of such cut away portions being compensated for by increasing the amount of metal and thereby its cross sectional strength value from the key bearing surfaces of the slots well toward the extreme front ends of the yoke.

A further object of the invention resides in the provision of a yoke member, the forward end portions of which are progressively increased in strength value from the forward ends of the yoke arms to the bearing portions of the key slots, the thickened portions forming an effective reinforcing means adapted to resist forces which in the present construction of yokes result in failures at points throughout the front ends of the yoke arms beginning in the key slots.

The invention further consists in the construction of the yoke and particular disposition of the metal in the forward portion of the yoke arms as will more fully hereinafter appear.

In the drawings illustrating the invention, the scope whereof is pointed out in the claims:

Figure 1 is a plan view of a horizontal yoke embodying the invention.

Figure 2 is an outside view in elevation of the forward portion of one of the yoke arms.

Figure 3 is a view in elevation of the inner face of one of the yoke arms.

Figures 4, 5 and 6 are detail sectional views on the lines *a—a, b—b* and *c—c* of Figure 2.

Referring to the drawings in which similar reference characters designate corresponding parts in the several views, my improved yoke 1 includes the spaced yoke arms 2—2 provided at their forward ends with key slots 3. It is at the forward ends of the key slots that failures in the yoke usually occur, and when subjected to excessive loads under service conditions, the metal gives away at points near the juncture of the flat portions of the key slot and the lowermost and uppermost portions of the key bearing surface, the break continuing through the forward end of the yoke in a slightly inclined but generally longitudinal direction. In the present construction of yokes it is usual to provide a reinforcing bead around the front end portion of each key slot, said bead conforming generally to the shape of the key bearing surface which is substantially semi-circular and serving to provide an increased bearing area of a greater width than the cross sectional area of the yoke arm. This reinforcing bead being substantially uniform in strength value has failed to resist the bearing loads to which the yoke is subjected at approximately the lowermost or uppermost portions of the key bearing surface. The present invention has been designed to more economically distribute the metal about the bearing portions of the key slots whereby its greatest strength value will be obtained in resisting the extremely heavy loads incident to service conditions.

The disposition of the metal reinforcing the key bearing surface and end portion of the yoke arm upon the outer face thereof, is determined by the area 4, said area being formed by the vertical boundary edge 5 and the diagonally extending boundary edges 6, the rear portion of said latter edges suitably merging into the key slot at points preferably at the rear of the effective bearing surface of the key slot. The area 4 provides the innermost face of the yoke arm and determines the relative thickness of the metal through this portion of the yoke, said area being gradually merged into the normal flat faces of the yoke throughout the inclined portions 7. The contour of the inclined portion where it unites with the flat portion of the yoke arm is preferably formed by the vertical boundary edge 8 and substantially horizontal boundary edges 9, the latter merging into the respective upper and lower edges of the key slots, as clearly shown in Figure 2.

The effective reinforcing value of the added metal is, as the result of the foregoing disposition thereof, caused to increase radially from the center about which the key bearing portion of the slot is struck. The metal is also arranged to provide a maximum longitudinally increased cross sectional area extending from points adjacent the juncture of the curved key bearing surfaces with the opposite flat sides thereof, to the boundary edges and from there progressively less to a point relatively close to the front of the yoke end. As a result of this construction the greatest possible strength value is obtained from the metal at points where heretofore frequent failures have occurred.

Upon the inner faces of the yoke arm the disposition of the metal is substantially similar in and about the bearing surface of the key slot, the area 10 being formed by the vertical boundary edge 11 and the diagonally extending boundary edges 12, the latter merging at their rear ends into the upper and lower edges of the key slot. This area 10 provides the innermost face of the yoke arm and together with the area 4 determines the full width and cross sectional area of this portion of the yoke arm. The area 10 merges into the flat surface of the yoke arm throughout the inclined surface 13, the contour of the said inclined edges conforming generally to the boundary edges 11 and 12, except for the portion 14 which is cut away at an angle extending from the outermost edge of the yoke to the vertical boundary edge 11. This cut-away portion provides for the full angular movement of the coupler as will be understood. It will be noted that said cut-away portion enters the normal thickness of the yoke arm and reduces its strength value so much but this loss of material at this point is readily compensated for by the addition of the metal above and forward of the key bearing surface.

A yoke constructed in accordance with my present invention provides a maximum disposition of the metal in advance of the key bearing portion of the slot so that the strains imparted thereto are effectively resisted in the planes of greatest stress throughout the yoke end, the maximum cross sectional area of the metal being arranged upon the line $a$—$a$ of Figure 2, as compared with the relatively less cross sectional area of the metal taken on the line $b$—$b$.

I claim:

1. A yoke for railway draft rigging comprising spaced arms, a key slot provided in each of said arms at the forward end thereof, said key slot having a bearing portion at the front end thereof, and means for reinforcing said bearing portions between the front end of the adjacent slot and the forward end of the yoke arm by progressively increasing the metal on both sides of the center lines of said arms in cross sectional area from points relatively close to the front end of each yoke arm to points arranged within a relatively large area adjacent the bearing portion of the respective key slot.

2. A yoke member for railway draft rigging comprising an arm having a key slot at the forward end thereof, said key slot being provided with a transverse bearing portion at the front thereof, and means for reinforcing said key bearing portion by increasing the cross sectional area of metal on both sides of the center line of said arm between said bearing portion and the front end of the yoke, the metal being disposed so that the area of maximum section lies on lines which diverge diagonally from the bearing portion of the key slot above and below the horizontal plane thereof.

3. A yoke member for railway draft rigging comprising an arm having at its forward end a key slot, a key bearing portion formed at the front end of said slot by thickening the metal to project beyond the opposite side faces of the arm, said projecting metal being continued forwardly and upwardly away from said key bearing portion to form a relatively large area of projection metal upon each side face of the arm and provide an area of increased cross section in planes which diverge forwardly from points above and below said key slot.

4. A railway draft yoke involving side arms having key slots in their forward ends, enlarged key bearing portions provided at the front end of said key slots, said key bearing portions projecting beyond the opposite side faces of the yoke arm, and means reinforcing said key bearing portion in each of said slots by continuing the projecting metal and maintaining the same of substantially the same thickness for a distance above, below and in advance of the key bearing portion, the contour of the reinforcing metal of substantially equal thickness being determined by boundary edges differing from the contour of the key bearing portion.

5. A horizontal yoke for railway draft rigging involving spaced side arms, each of said arms having a key slot at the forward end thereof, said key slot being provided with a relatively large key bearing portion formed by projecting the metal beyond the opposite side faces of each arm, said metal being continued forwardly and upwardly and maintained at the same thickness for a distance in advance of the key bearing portion of the slot, which distance is defined by the boundary edges of said metal of uniform thickness, said edges being angularly disposed to bound the metal adjoining said key bearing portion.

6. A horizontal yoke for draft rigging comprising spaced side arms, each of said arms being formed with a key slot at the forward end thereof, and key bearing portions provided at the front ends of said slots, said key bearing portions being reinforced by increasing the cross sectional area of metal in said yoke arm to a maximum forwardly of the slot in radial planes extending from the center about which the key bearing portions of each slot is formed.

7. A yoke member for draft rigging involving an arm formed with a key slot having a key bearing portion projecting on opposite sides from the vertical planes of said arm, the cross sectional area of the metal adjacent the key bearing portion being greater on a diagonal plane intersecting said bearing portion than on either horizontal or vertical planes intersecting said bearing portion.

8. A yoke member for draft rigging involving an arm formed with a key slot having a reinforced key bearing portion extending outwardly beyond the vertical planes of said yoke arm, the cross sectional area of the metal forward of the said key bearing portion being greater on planes arranged at an angle to the center line of said slot than on a plane coincident with said center line.

9. In a railway draft rigging, the combination with a coupler and horizontal yoke, said yoke involving spaced side arms having their inner opposite faces at the forward ends thereof cut away to accommodate the side faces of said coupler when subjected to angular movement, key slots provided in the forward end of each yoke arm and formed with a key bearing portion projecting beyond the opposite side faces of each yoke arm, and means reinforcing said key bearing portions by increasing the thickness of the metal in variable radial planes passing through the key bearing portions, the thickened metal adjacent the key bearing portions upon the inner opposite faces of the yoke arms being adapted to merge into the cut away portions on the forward ends of said yoke arms providing for the aforesaid angular movement of the coupler.

In testimony whereof I affix my signature.

BYERS W. KADEL.